United States Patent
Yang et al.

(10) Patent No.: US 10,645,903 B2
(45) Date of Patent: May 12, 2020

(54) BOWL WITH FREELY ADJUSTABLE HEIGHT

(71) Applicant: ZHUHAI HENGQIN SUPER TECHNOLOGY LTD., Zhuhai, Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 267 days.

(21) Appl. No.: 15/452,683

(22) Filed: Mar. 7, 2017

(65) Prior Publication Data

US 2018/0199540 A1    Jul. 19, 2018

(30) Foreign Application Priority Data

Jan. 13, 2017  (CN) ..................... 2017 2 0039843 U
Jan. 24, 2017  (CN) ..................... 2017 2 0090237 U

(51) Int. Cl.
*A01K 5/01*       (2006.01)

(52) U.S. Cl.
CPC .............. *A01K 5/0114* (2013.01); *A01K 5/01* (2013.01)

(58) Field of Classification Search
CPC ................................ A01K 5/0114; A01K 5/01
USPC ................................... 119/61.5, 61.56, 61.57
See application file for complete search history.

(56) References Cited

U.S. PATENT DOCUMENTS 5,941,575 A * 8/1999 Herbst .................... A47L 9/244
                                                        285/7
6,901,880 B2 * 6/2005 Hammer .............. A01K 5/0114
                                                        119/61.4

FOREIGN PATENT DOCUMENTS

DE       102006006189 B3 *  6/2007   ........... A01K 5/0114

OTHER PUBLICATIONS

Translation of DE 102006006189 B3 (Year: 2007).*

* cited by examiner

*Primary Examiner* — Kathleen I Alker
*Assistant Examiner* — Steven J Shur

(57) ABSTRACT

The disclosure provides a bowl with a freely adjustable height, comprising: a pedestal; a lifting support rod, whose one end is fixed on the pedestal; a bowl seat, which is fixed on the other end of the lifting support rod; a lifting locking piece, which has a fixing piece and an extrusion piece matched with each other, wherein the fixing piece has a fixing hole, the lifting support rod penetrates through the fixing hole and is partially located in the fixing hole, the extrusion piece exerts an action force to the fixing piece so as to fix the lifting support rod on the bowl seat, and the fixing piece is matched with and fixed on the bowl seat or arranged on the bowl seat; and a bowl body, which is arranged on the bowl seat. According to the disclosure, the height of the bowl may be adjusted freely.

7 Claims, 16 Drawing Sheets

US 10,645,903 B2

BOWL WITH FREELY ADJUSTABLE HEIGHT

CROSS REFERENCE TO RELATED APPLICATIONS

The present application claims the benefit of Chinese Utility Model Application No. 201720039843.1 filed on Jan. 13, 2017 and Chinese Utility Model Application No. 201720090237.2 filed on Jan. 24, 2017. All the above are hereby incorporated by reference.

TECHNICAL FIELD

The disclosure relates to a bowl with a freely adjustable height, and in particular to a bowl with a freely adjustable height that has a single support rod.

BACKGROUND

Along with the development of economy, people's living standards are increasingly improved, pets have become increasingly close partners of people, no matter for human beings or pets, eating and drinking are always the most important problems, and eating and drinking are involved with bowls; as the pet is growing up, in order to let the pet eat more comfortably, people must change bowls with different heights, and, after months and years, it is easy to cause waste; meanwhile, when the pet enters the old stage, the pet will have a difficulty in lowering the head, and a bowl with improper height will cause a difficulty for the pet to eat; at present, height-adjustable pet bowls available on the market are complex in structures, mainly including two types. One type is that the bowl is lift through four legs, the operation for this type of bowl is inconvenient, and the four legs probably may have different heights, resulting in unevenness; the other type is that the bowl is lift through a single rod, however the height to be lift has a few shifts, and the height cannot be lift randomly.

Therefore, it is necessary to design a fine bowl with a freely adjustable height, so as to overcome the above problems.

SUMMARY

In view of the problems mentioned in the background, the disclosure aims to provide a bowl with a freely adjustable height that may be adjusted in height freely by setting a lifting locking piece, a fixing piece and an extrusion piece to match with and fix a lifting support rod.

In order to achieve the above aim, the disclosure adopts a technical means as follows.

A bowl with a freely adjustable height comprises: a pedestal; a lifting support rod, whose one end is fixed on the pedestal; a bowl seat, which is fixed on the other end of the lifting support rod; a lifting locking piece, which has a fixing piece and an extrusion piece matched with each other, wherein the fixing piece has a fixing hole, the lifting support rod penetrates through the fixing hole and is partially located in the fixing hole, the extrusion piece exerts an action force to the fixing piece so as to fix the lifting support rod on the bowl seat, and the fixing piece is matched with and fixed on the bowl seat or arranged on the bowl seat; and a bowl body, which is arranged on the bowl seat.

Further, the bowl seat has a through hole, the fixing piece is formed by integrally extending from one side of the bowl seat, the fixing hole is intercommunicated with the through hole, and the lifting support rod penetrates through the fixing hole and the through hole and is partially located in the fixing hole.

Further, on one side of the bowl seat is provided an extending portion which is provided with a through hole, the fixing piece has a locating portion fixed in the through hole and a main body portion extending downwards from the locating portion, and a fixing hole is arranged penetrating through the locating portion and the main body portion.

Further, the fixing piece has a main body portion, one side of which is provided with a through groove penetrating therethrough, the through groove is intercommunicated with the through hole, the two sides of the through groove are provided with a boss respectively, both bosses are provided with a via hole respectively, a rotating shaft is located in the two via holes, a friction body is located in the through groove and contacts the lifting support rod, the extrusion piece has a rotating portion which is located on one side of the friction body far away from the lifting support rod and which is abutted against the friction body, the rotating portion is provided with an eccentric hole penetrating therethrough, the rotating shaft is located in the eccentric hole, by means of this rotating shaft the extrusion piece is fixed on the main body portion, a wrenching portion is arranged on one side of the rotating portion, and by means of this wrenching portion the rotating portion is enabled to rotate to a locking position and an opening position.

Further, the main body portion is opened with a moveable groove from bottom up, and the moveable groove is communicated with the fixing hole and the through groove.

Further, the periphery of the locating portion is provided with an external thread, the upper end position inside a bowl seat locking piece is provided with an internal thread correspondingly, the bowl seat locking piece is sleeved outside the extending portion, the locating portion penetrates out the through hole of the extending portion upwards, and the internal thread and the external thread are matched and fixed with each other.

Further, two barrier ribs are convexly arranged on the two sides of the through groove respectively, the barrier ribs approach the fixing hole and abut against the two sides of the friction body respectively, the friction body is respectively provided with a recess corresponding to the two barrier ribs, when the rotating portion is rotated to the locking position, the barrier rib is in tight fit with the recess and the friction body is tightly against the lifting support rod, and, when the rotating portion is rotated to the opening position, the barrier rib is in loose fit with the recess, the friction body and the lifting support rod are spaced by certain distance or are in contact only.

Further, one side of the friction body close to the rotating portion is concavely provided with an adapting portion, when the rotating portion is rotated to the locking position, the rotating portion is in tight fit with the adapting portion, and, when the rotating portion is rotated to the opening position, the rotating portion is in loose fit with the adapting portion.

Further, the two sides of the bowl seat are provided with a perforation respectively, and two bowl bodies are fixedly arranged in the two perforations respectively.

Further, the fixing piece has a locating portion matched with and fixed on the bowl seat or arranged on the bowl seat, the locating portion is provided with a main body portion downwards, the fixing hole is arranged penetrating through the locating portion and the main body portion, a plurality of securing portions is extended downwards from the main body portion, every two adjacent securing portions have a deforming groove therebetween, the extrusion piece extrudes the securing portion and the securing portion secures the lifting support rod.

Further, outside the main body portion is provided an external thread, the extrusion piece is provided with a securing hole penetrating therethrough, on the upper end inside the securing hole is provided an internal thread, the hole diameter at the upper end is greater than the outer diameter of the securing portion, the hole diameter at the lower end inside the securing hole is less than the outer diameter of the securing portion, when the internal thread and the external thread are matched and fixed with each other, the securing hole extrudes the securing portion, the volume of the deforming groove shrinks, the securing portion is tightly against the lifting support rod, and the lifting support rod and the fixing piece are in the locking position.

Further, the extrusion piece is matched with and fixed on or arranged on the bowl seat, the extrusion piece is provided with a securing hole penetrating therethrough, the fixing piece is provided with a plurality of deforming portions arranged surrounding the fixing hole, the deforming portions are located in the securing hole, below the deforming portion is provided a stop portion, when the stop portion abuts against the extrusion portion upwards, the deforming portion is tightly against the lifting support rod, and the lifting supporting rod and the fixing piece are in the locking position.

Further, the deforming portion shrinks gradually towards the direction far away the stop portion.

Further, the fixing piece has a lengthening portion, which is formed by extending downwards from the stop portion and which is against the lifting support rod, and the two outer sides of the lengthening portion are provided with a protruding point respectively.

Further, the pedestal is provided with a circular hole, a fixing soft sleeve is fixedly arranged in the circular hole downwards, the lifting support rod is fixed in the fixing soft sleeve, and the fixing soft sleeve shrinks downwards.

Further, the pedestal is provided with a circular hole, the lifting support rod is fixed on the pedestal by means of a clamping piece, the clamping piece has a base, a friction piece and an upper cap that are mutually matched, a clamping hole penetrates through the upper cover, the friction piece and the base up and down, and the lifting support rod is fixedly arranged in the clamping hole.

Further, the upper end of the base has an external screw tooth, the lower end of the base has a plurality of isolating portions, between every two adjacent isolating portions is provided a strip-shaped hole, the strip-shaped hole is intercommunicated with the clamping hole, an abutting portion is connected below the base, the inner side of the friction piece is provided with a plurality of convex ribs at intervals, the convex ribs enter the strip-shaped holes correspondingly and are exposed to the clamping hole, on one side of the friction piece is provided a notch penetrating therethrough up and down, the friction piece is sleeved on the periphery of the isolating portions and abuts against the abutting portion downwards, and the upper cover is sleeved on the periphery of the friction piece.

Further, the upper end of the upper cover is provided with an internal screw tooth, which is matched and fixed with the external screw tooth, and all the upper cover, the friction piece and the base shrink gradually upwards.

Further, the outer side of the upper cover is provided with a plurality of reinforcing ribs, which are arranged surrounding the outer circumference of the upper cover, below the plurality of reinforcing ribs is provided a resisting portion, and the resisting portion and the abutting portion are matched to locate.

Further, the convex rib shrinks towards the centre of the clamping hole, and the two sides of the free end of the convex rib are provided with a guiding portion respectively.

Compared with existing technologies, the disclosure has benefits as follows.

In the above bowl with a freely adjustable height, the fixing piece and the extrusion piece of the lifting locking piece are matched with each other, the lifting support rod penetrates through the fixing hole 1 and is partially located in the fixing hole 1, the extrusion piece exerts an action force to the fixing piece so as to fix the lifting support rod on the bowl seat, and the fixing piece may be matched with and fixed on the bowl seat or arranged on the bowl seat, thus, the height of the bowl may be adjusted freely, the design adopts a simple mechanical structure to enable the production of friction so as to fix the bowl at certain height, stepless regulation of height may be realized, the installation is convenient, the height of the bowl may be regulated depending on different growth stages of pets, waste is avoided, and, when the bowl is not used, components may be disassembled, so as to reduce transport and storage volumes.

DESCRIPTION OF DESIGNATORS IN DRAWINGS OF SPECIFIC EMBODIMENTS

Figure 1:
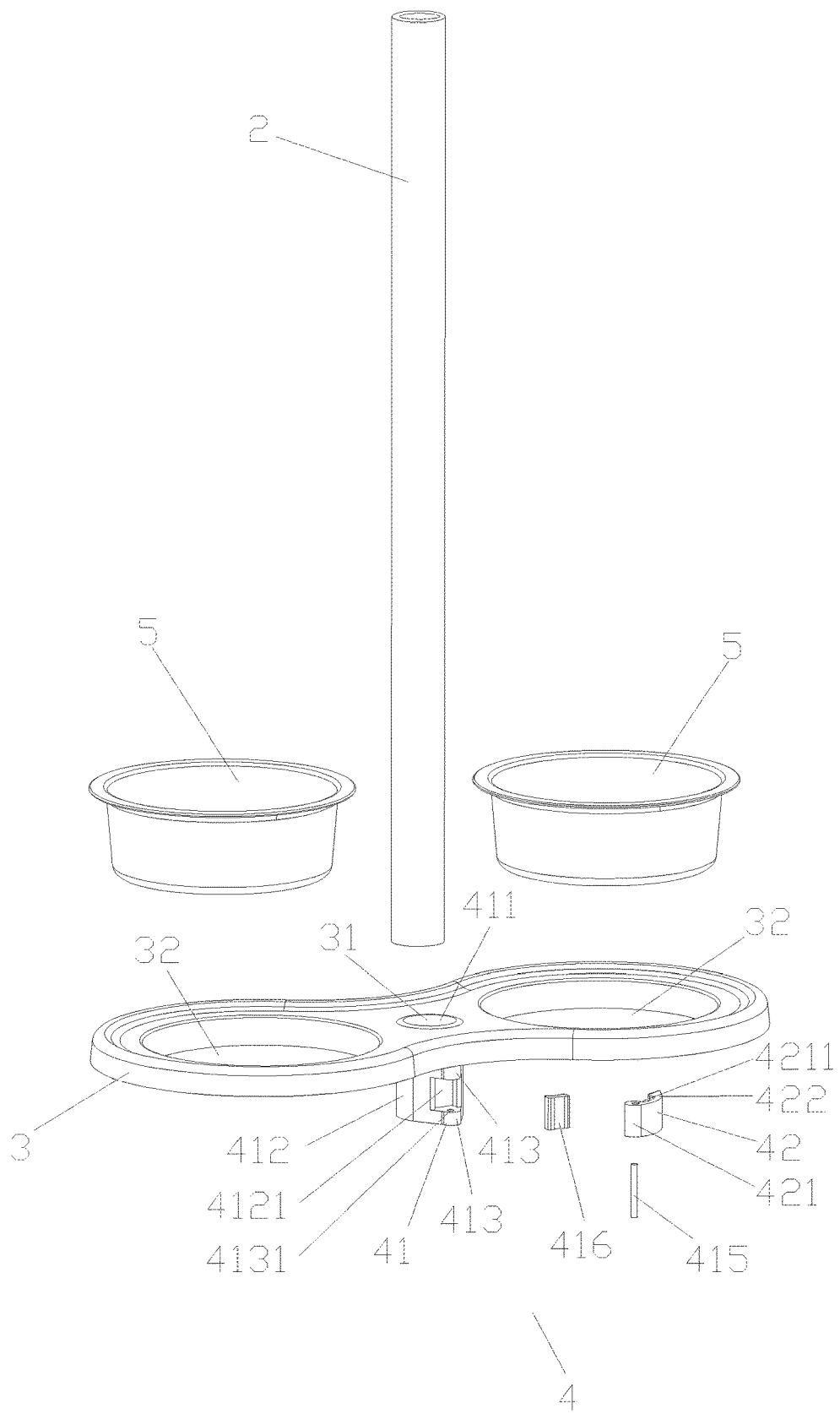
FIG. 1 is a diagram illustrating one part of an Embodiment 1 of a bowl with a freely adjustable height according to the disclosure.
Figure 2:
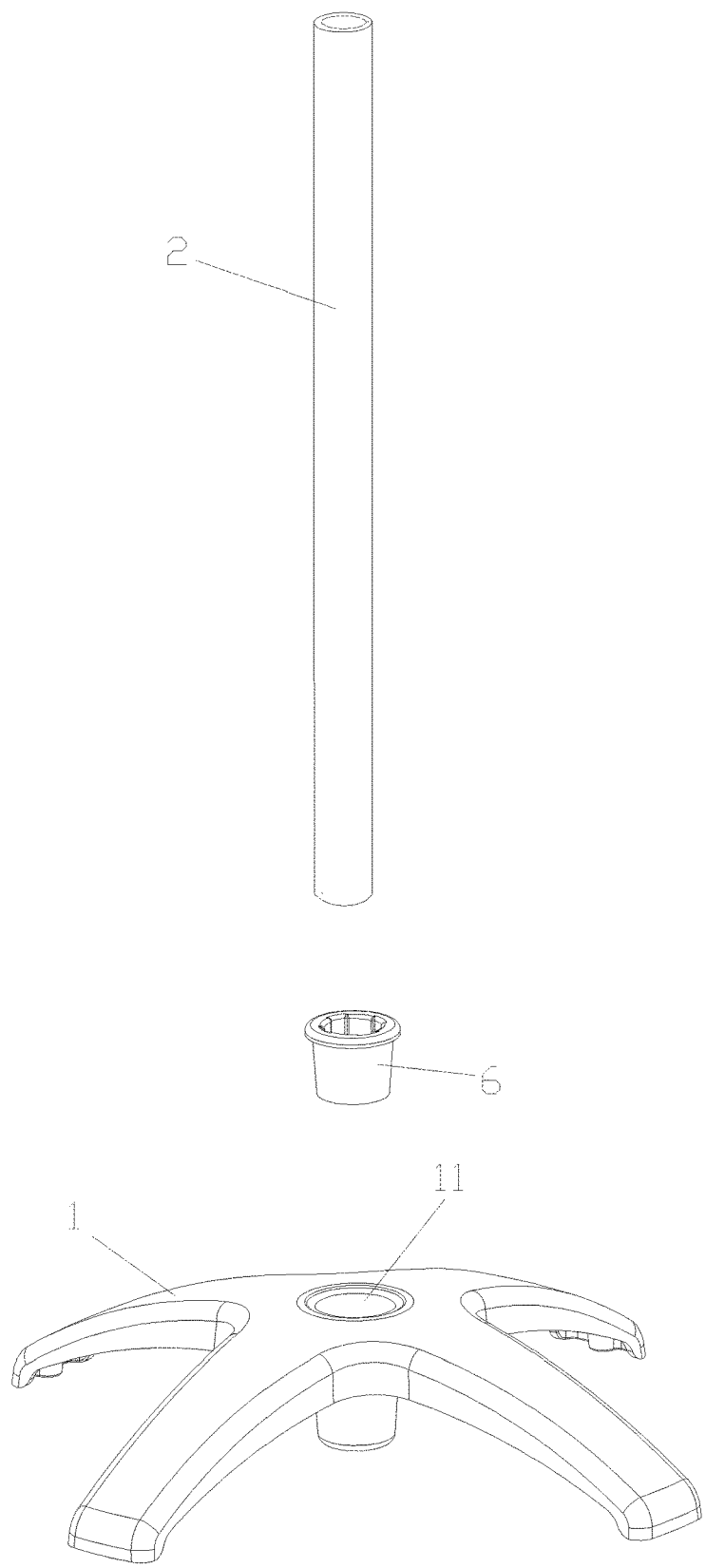
FIG. 2 is a diagram illustrating the other part of the Embodiment 1 of the bowl with a freely adjustable height according to the disclosure.
Figure 2A:
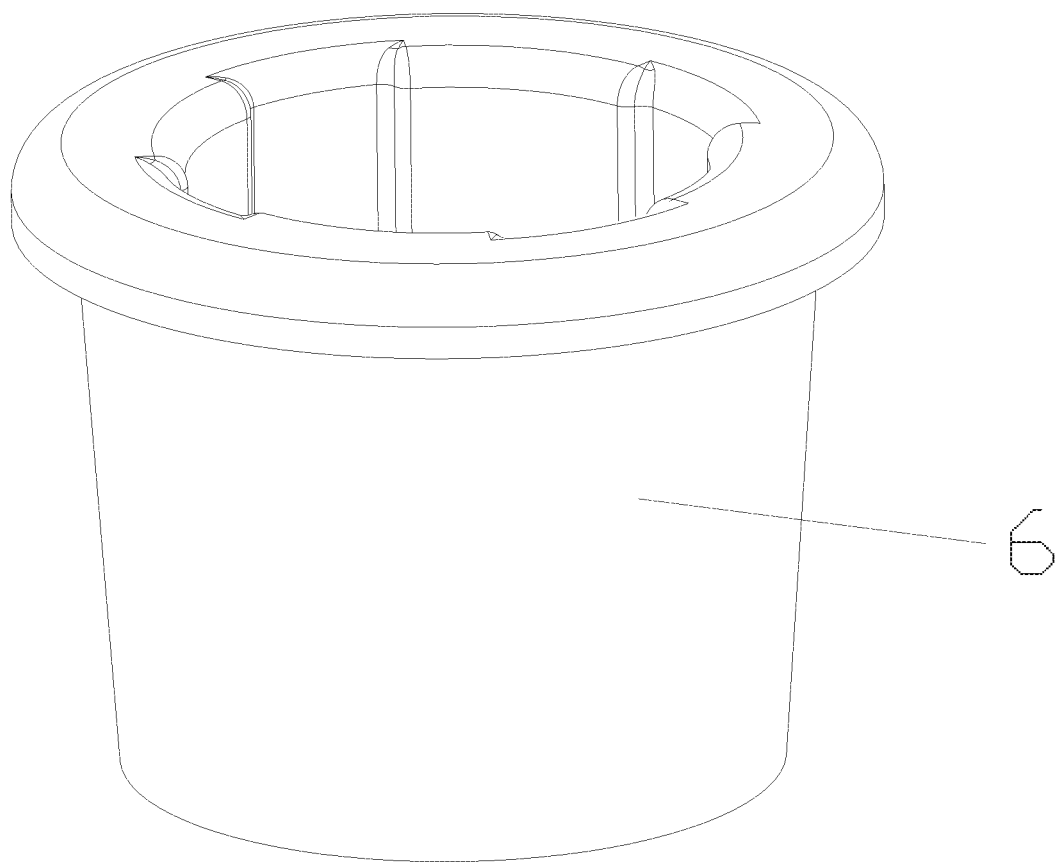
FIG. 2*a* is an enlarged structure diagram of a fixing soft sleeve in FIG. 2.

| | | |
|---|---|---|
| pedestal 1 | circular hole 11 | lifting support rod 2 |
| bowl seat 3 | through hole 31 | perforation 32 |
| extending portion 33 | lifting locking piece 4 | fixing piece 41 |
| fixing hole 411 | main body portion 412 | through groove 4121 |
| moveable groove 4122 | boss 413 | via hole 4131 |
| barrier rib 414 | recess 4141 | rotating shaft 415 |
| friction body 416 | locating portion 417 | securing portion 418 |
| deforming groove 4181 | deforming portion 419 | stop portion 4191 |
| extrusion piece 42 | rotating portion 421 | eccentric hole 4211 |
| wrenching portion 422 | securing hole 423 | bowl body 5 |
| fixing soft sleeve 6 | bowl seat locking piece 7 | clamping piece 8 |
| base 81 | friction piece 82 | upper cover 83 |
| clamping hole 84 | isolating portion 85 | strip-shaped hole 86 |
| abutting portion 87 | convex rib 88 | notch 89 |
| base portion 90 | reinforcing bar 91 | thread portion 92 |
| mating portion 93 | relief groove 94 | bottom cap 95 |
| adapting portion 4161 | reinforcing rib 96 | resisting portion 97 |
| guiding portion 98 | lengthening portion 99 | protruding point 991 |

DESCRIPTION OF THE EMBODIMENTS

In order to better understand the purpose, the structure, the features, the functions, etc. of the disclosure, the disclosure is described below in further detail in conjunction with accompanying drawings and specific embodiments.

In the disclosure, the bowl with a freely adjustable height is convenient for feeding pets.

The technical scheme of the disclosure is described below in detail in conjunction with accompanying drawings and specific embodiments.

Embodiment 1, Please Refer to FIG. 1, FIG. 2, FIG. 2a, FIG. 3a and FIG. 3b

A bowl with a freely adjustable height provided by the embodiment of the disclosure comprises: a pedestal 1; a lifting support rod 2, whose one end is fixed on the pedestal 1; a bowl seat 3, which is fixed on the other end of the lifting support rod 2; a lifting locking piece 4, which has a fixing piece 41 and an extrusion piece 42 matched with each other, wherein the fixing piece 41 has a fixing hole 411, the lifting support rod 2 penetrates through the fixing hole 411 and is partially located in the fixing hole 411, the extrusion piece 42 exerts an action force to the fixing piece 41 so as to fix the lifting support rod 2 on the bowl seat 3, the bowl seat 3 has a through hole 31, the fixing piece 41 is formed by integrally extending from one side of the bowl seat 3, thus being firm and stable, the fixing hole 411 is intercommunicated with the through hole 31, and the lifting support rod 2 penetrates through the fixing hole 411 and the through hole 31 and is partially located in the fixing hole 411, and the two sides of the through hole 31 of the bowl seat 3 are respectively provided with a perforation 32; and two bowl bodies 5, which are fixedly arranged in the two perforations 32 respectively, wherein the bowl body 5 is made of hard plastic, such as plastic, melamine or ceramic.

The fixing piece 41 has a main body portion 412, which is formed by integrally extending downwards from the bowl seat 3, thus being firm and stable, and one side of which is provided with a through groove 4121 penetrating therethrough, the through groove 4121 is intercommunicated with the through hole 31, the two sides of the through groove 4121 are provided with a boss 413 respectively, both bosses 413 are provided with a via hole 4131 respectively, a rotating shaft 415 is located in the two via holes 4131, a friction body 416 is located in the through groove 4121 and contacts the lifting support rod 2, the extrusion piece 42 has a rotating portion 421 which is located on one side of the friction body 416 far away from the lifting support rod 2 and which is abutted against the friction body 416, the rotating portion 421 is provided with an eccentric hole 4211 penetrating therethrough, the rotating shaft 415 is located in the eccentric hole 4211, by means of this rotating shaft 415 the extrusion piece 42 is fixed on the main body portion 412, a wrenching portion 422 is arranged on one side of the rotating portion 421, and by means of this wrenching portion 422 the rotating portion 421 is enabled to rotate to a locking position and an opening position, the operation is convenient.

Two barrier ribs 414 are convexly arranged on the two sides of the through groove 4121 respectively, the barrier ribs 414 approach the fixing hole 411 and abut against the two sides of the friction body 416 respectively, the friction body 416 is provided with a recess 4141 corresponding to the two barrier ribs 414 respectively, when the rotating portion 421 is rotated to the locking position, the barrier rib 414 is in tight fit with the recess 4141 and the friction body 416 is tightly against the lifting support rod 2, and, when the rotating portion 421 is rotated to the opening position, the barrier rib 414 is in loose fit with the recess 4141, the friction body 416 and the lifting support rod 2 are spaced by certain distance or are in contact only. One side of the friction body 416 close to the rotating portion 421 is concavely provided with an adapting portion 4161, when the rotating portion 421 is rotated to the locking position, the rotating portion 421 is in tight fit with the adapting portion 4161, and, when the rotating portion 421 is rotated to the opening position, the rotating portion 421 is in loose fit with the adapting portion 4161; through the close cooperation, the lifting support rod 2 may be stably fixed in the fixing hole 411 and will not loosen.

The pedestal 1 is provided with a circular hole 11, a fixing soft sleeve 6 is fixed in the circular hole 11 downwards, the lifting support rod 2 is fixed in the fixing soft sleeve 6, and the fixing soft sleeve 6 shrinks gradually downwards; the structure is simple, the cost is low and the operation is easy.

Embodiment 2, Please Refer to FIG. 4, FIG. 4a, FIG. 5, FIG. 6, FIG. 7a and FIG. 7b A bowl with a freely adjustable height provided by the embodiment of the disclosure comprises: a pedestal 1; a lifting support rod 2, whose one end is fixed on the pedestal 1; a bowl seat 3, which is fixed on the other end of the lifting support rod 2; a lifting locking piece 4, which has a fixing piece 41 and an extrusion piece 42 matched with each other, wherein the fixing piece 41 has a fixing hole 411, the lifting support rod 2 penetrates through the fixing hole 411 and is partially located in the fixing hole 411, the extrusion piece 42 exerts an action force to the fixing piece 41 so as to fix the lifting support rod 2 on the bowl seat 3, on one side of the bowl seat 3 is provided an extending portion 33 which is provided with a through hole 31, the fixing piece 41 has a locating portion 417 fixed in the through hole 31 and a main body portion 412 extending downwards from the locating portion 417, and a fixing hole 411 is arranged penetrating through the locating portion 417 and the main body portion 412, the fixing hole 411 is intercommunicated with the through hole 31, and the lifting support rod 2 penetrates through the fixing hole 411 and the through hole 31 and is partially located in the fixing hole 411, and the two sides of the through hole 31 of the bowl seat 3 are respectively provided with a perforation 32; and two bowl bodies 5, which are fixedly arranged in the two perforations 32 respectively, wherein the bowl body 5 is made of hard plastic, such as plastic, melamine or ceramic.

One side of the main body portion 412 is provided with a through groove 4121 penetrating therethrough, the through groove 4121 is intercommunicated with the through hole 31, the two sides of the through groove 4121 are provided with a boss 413 respectively, both bosses 413 are provided with a via hole 4131 respectively, a rotating shaft 415 is located in the two via holes 4131, a friction body 416 is located in the through groove 4121 and contacts the lifting support rod 2, the extrusion piece 42 has a rotating portion 421 which is located on one side of the friction body 416 far away from the lifting support rod 2 and which is abutted against the friction body 416, the rotating portion 421 is provided with an eccentric hole 4211 penetrating therethrough, the rotating shaft 415 is located in the eccentric hole 4211, by means of this rotating shaft 415 the extrusion piece 42 is fixed on the main body portion 412, a wrenching portion 422 is arranged on one side of the rotating portion 421, and by means of this wrenching portion 422 the rotating portion 421 is enabled to rotate to a locking position and an opening position. In addition, the main body portion 412 is opened with a moveable groove 4122 from bottom up, and the moveable groove 4122 is communicated with the fixing hole 411 and the through groove 4121, thus, certain moveable space is reserved, the lifting support rod 2 is elastically fixed in the fixing hole 411 and the lifting support rod 2 will not be damaged, and an auxiliary function is achieved. The periphery of the locating portion 417 is provided with an external thread, the upper end position inside a bowl seat locking piece 7 is provided with an internal thread correspondingly, the bowl seat locking piece 7 is sleeved outside the extending portion 33, the locating portion 417 penetrates out the through hole 31 of the extending portion 33 upwards, and the internal thread and the external thread are matched and fixed with each other.

Two barrier ribs 414 are convexly arranged on the two sides of the through groove 4121 respectively, the barrier ribs 414 approach the fixing hole 411 and abut against the two sides of the friction body 416 respectively, the friction body 416 is respectively provided with a recess 4141 corresponding to the two barrier ribs 414, when the rotating portion 421 is rotated to the locking position, the barrier rib 414 is in tight fit with the recess 4141 and the friction body 416 is tightly against the lifting support rod 2, and, when the rotating portion 421 is rotated to the opening position, the barrier rib 414 is in loose fit with the recess 4141, the friction body 416 and the lifting support rod 2 are spaced by certain distance or are in contact only. One side of the friction body 416 close to the rotating portion 421 is concavely provided with an adapting portion 4161, when the rotating portion 421 is rotated to the locking position, the rotating portion 421 is in tight fit with the adapting portion 4161, and, when the rotating portion 421 is rotated to the opening position, the rotating portion 421 is in loose fit with the adapting portion 4161.

The pedestal 1 is provided with a circular hole 11, the lifting support rod 2 is fixed on the pedestal 1 by means of a clamping piece 8, the clamping piece 8 has a base 81, a friction piece 82 and an upper cap 83 that are mutually matched, a clamping hole 84 penetrates through the upper cover 83, the friction piece 82 and the base 81 up and down, the lifting support rod 2 is fixedly arranged in the clamping hole 84, the upper end of the base 81 has an external screw tooth, the lower end of the base 81 has a plurality of isolating portions 85, between every two adjacent isolating portions 85 is provided a strip-shaped hole 86, the strip-shaped hole 86 is intercommunicated with the clamping hole 84, an abutting portion 87 is connected below the base, the inner side of the friction piece 82 is provided with a plurality of convex ribs 88 at intervals, the convex ribs 88 enter the strip-shaped holes 86 correspondingly and are exposed to the clamping hole 84, on one side of the friction piece 82 is provided a notch 89 penetrating therethrough up and down, the friction piece 82 is sleeved on the periphery of the isolating portions 85 and abuts against the abutting portion 87 downwards, and the upper cover 83 is sleeved on the periphery of the friction piece 82, the upper end of the upper cover 83 is provided with an internal screw tooth, which is matched and fixed with the external screw tooth, and all the upper cover 83, the friction piece 82 and the base 81 shrink gradually upwards, with stable fitting.

The outer side of the upper cover 83 is provided with a plurality of reinforcing ribs 96, which are arranged surrounding the outer circumference of the upper cover, so that the intensity is ensured, below the plurality of reinforcing ribs 96 is provided a resisting portion 97, the resisting portion 97 and the abutting portion 87 are matched to locate, so as to realize accurate assembly, the convex rib 88 shrinks towards the centre of the clamping hole 84, and the two sides of the free end of the convex rib 88 are provided with a guiding portion 98 respectively, wherein the guiding portion 98 is arranged to guide the convex rib 88 to enter the strip-shaped hole 86.

Figure 3A:
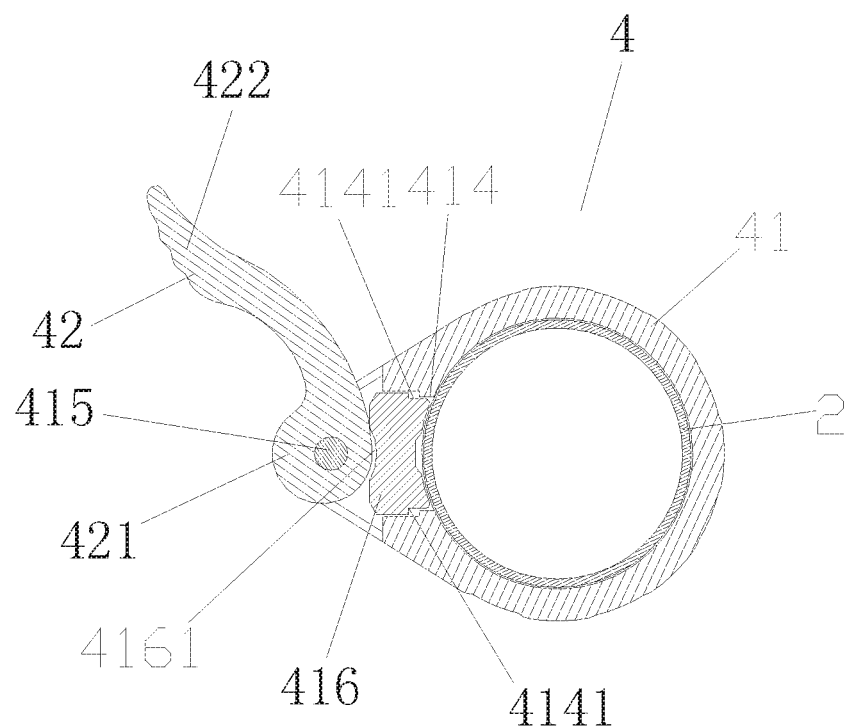
FIG. 3*a* and FIG. 3*b* are diagrams illustrating that a lifting support rod of the Embodiment 1 of the bowl with a freely adjustable height according to the disclosure is in an opening position and a locking position.
Figure 3B:
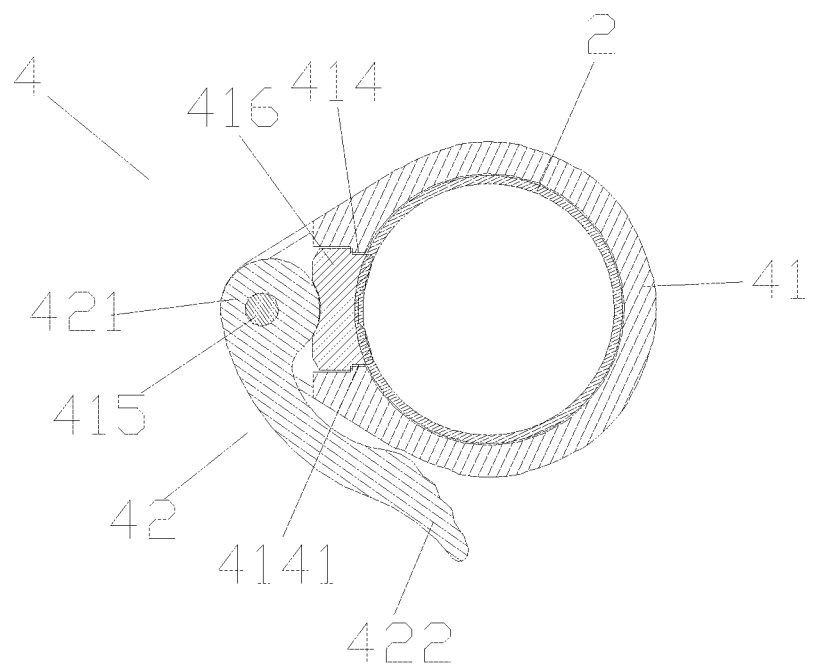
Figure 4:
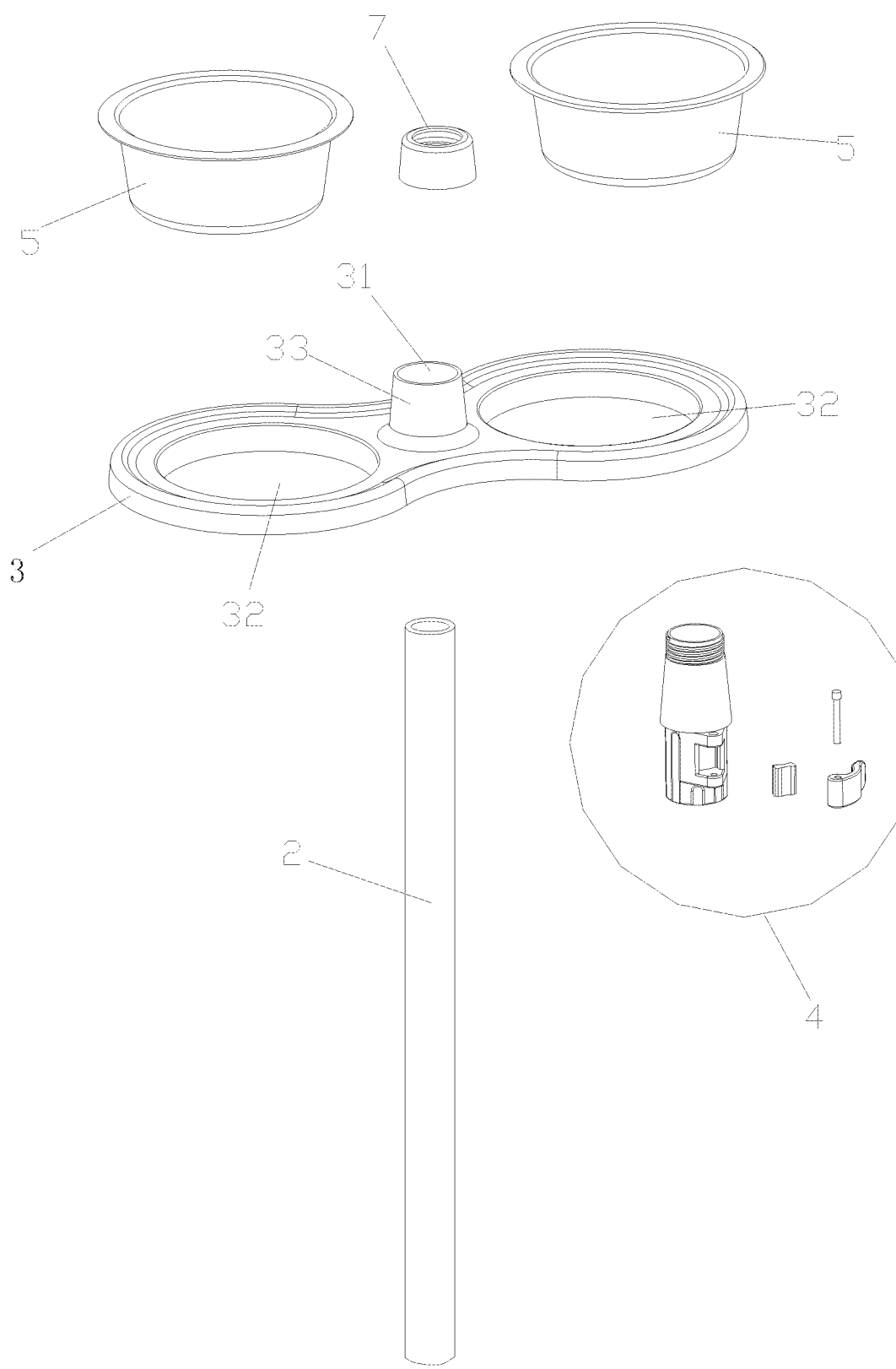
FIG. 4 is a diagram illustrating one part of an Embodiment 2 of a bowl with a freely adjustable height according to the disclosure.
Figure 4A:
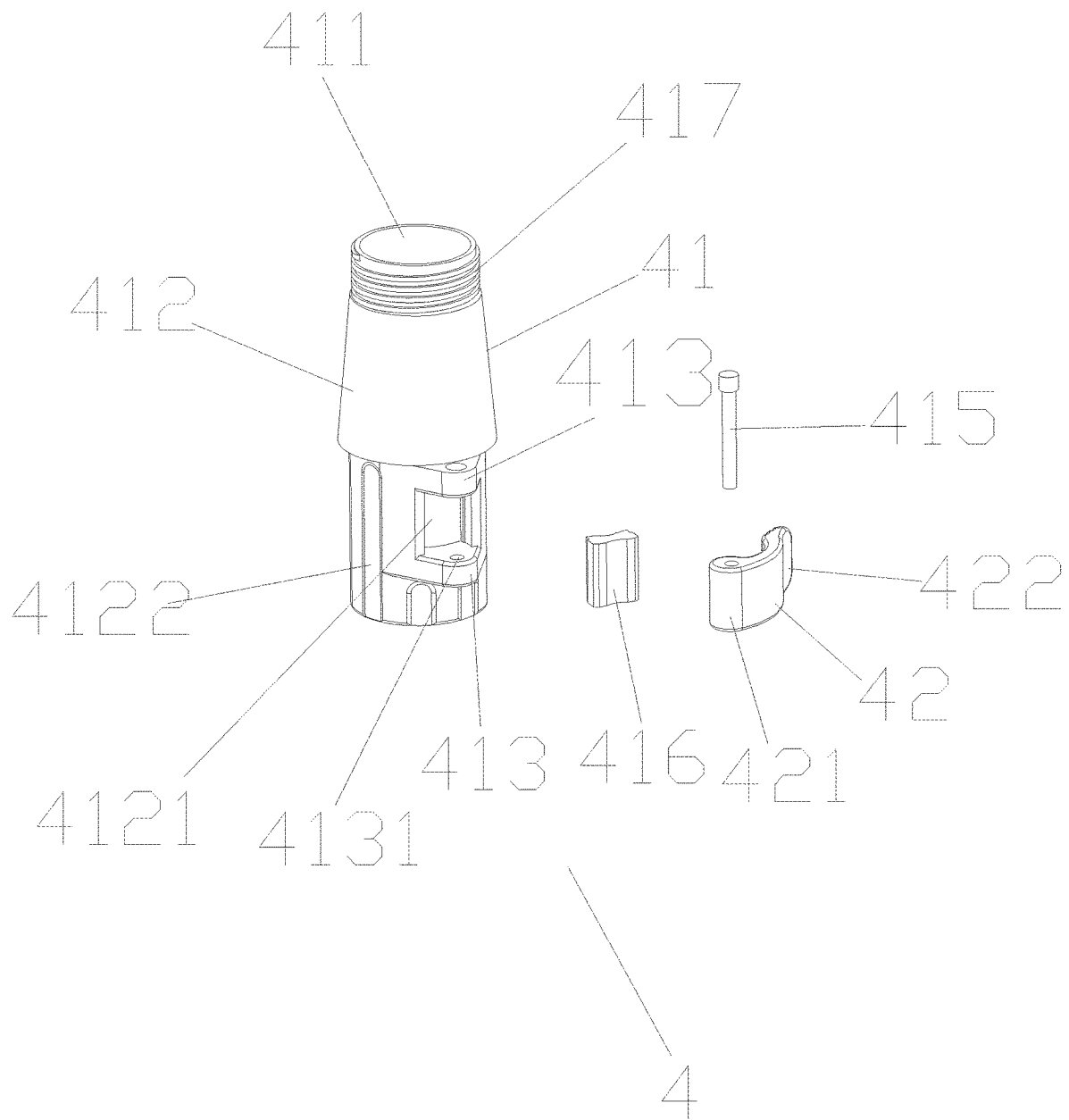
FIG. 4*a* is an enlarged structure diagram of a lifting locking piece in FIG. 4.
Figure 5:
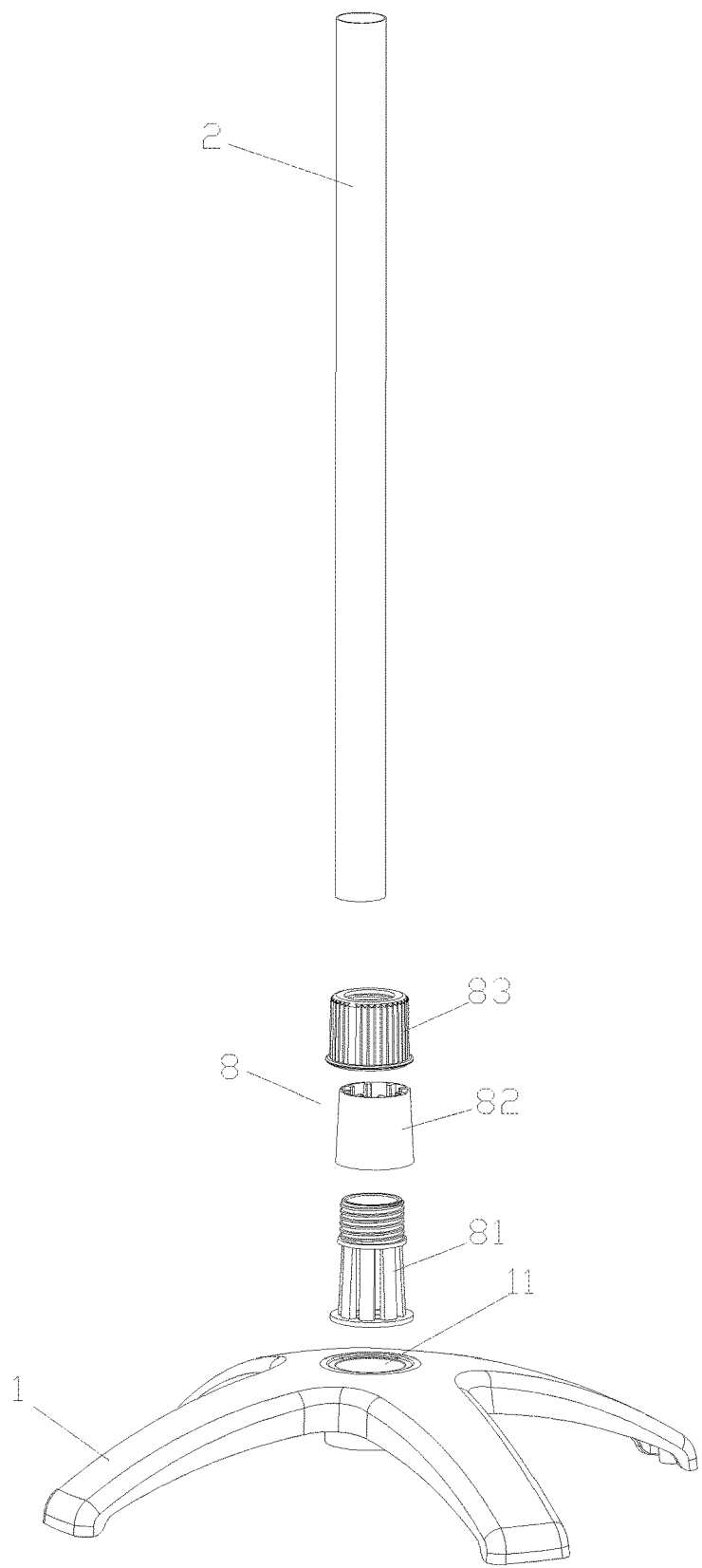
FIG. 5 is a diagram illustrating the other part of the Embodiment 2 of the bowl with a freely adjustable height according to the disclosure.
Figure 6:
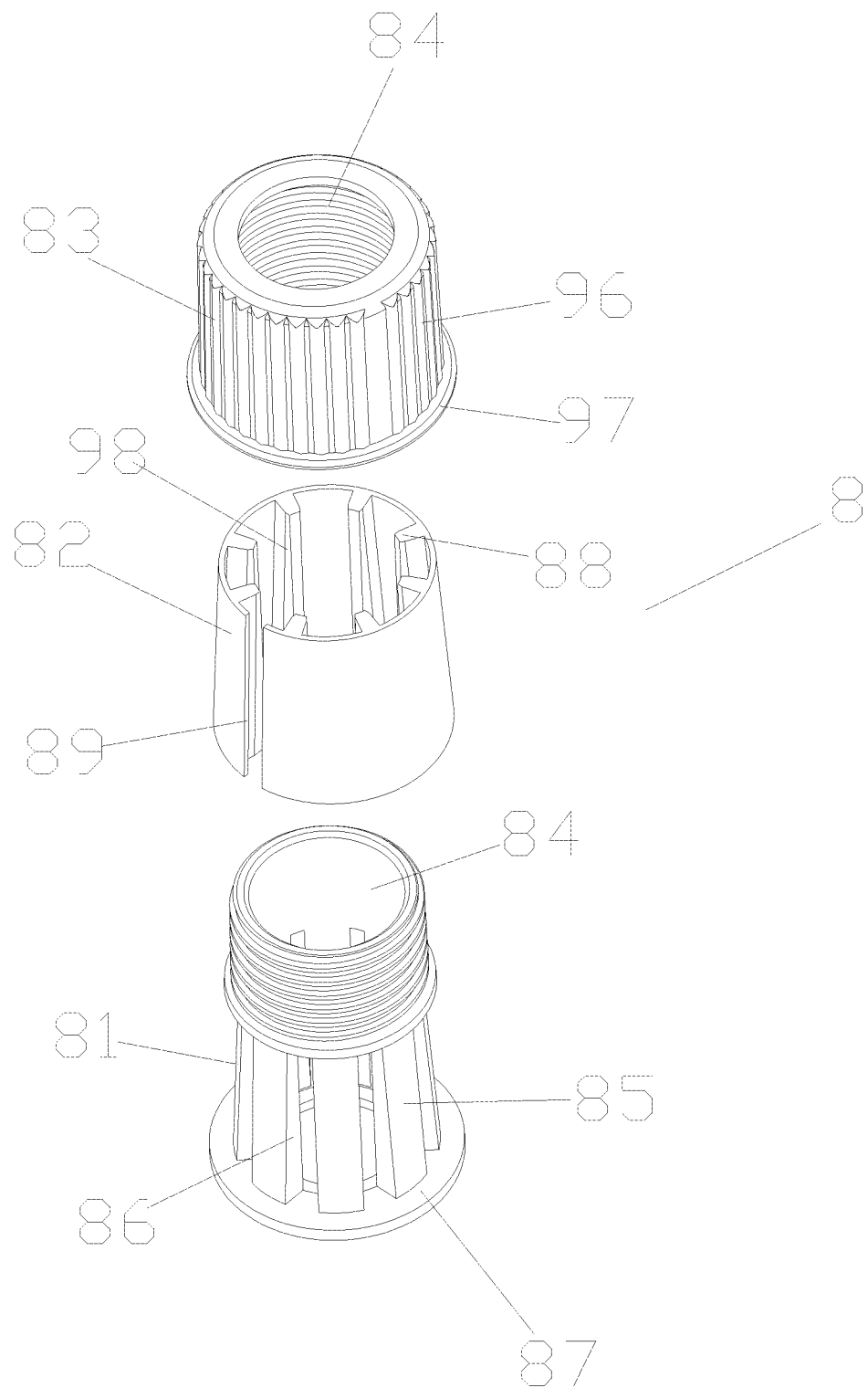
FIG. 6 is enlarged view of a clamping piece in FIG. 5.
Figure 7A:
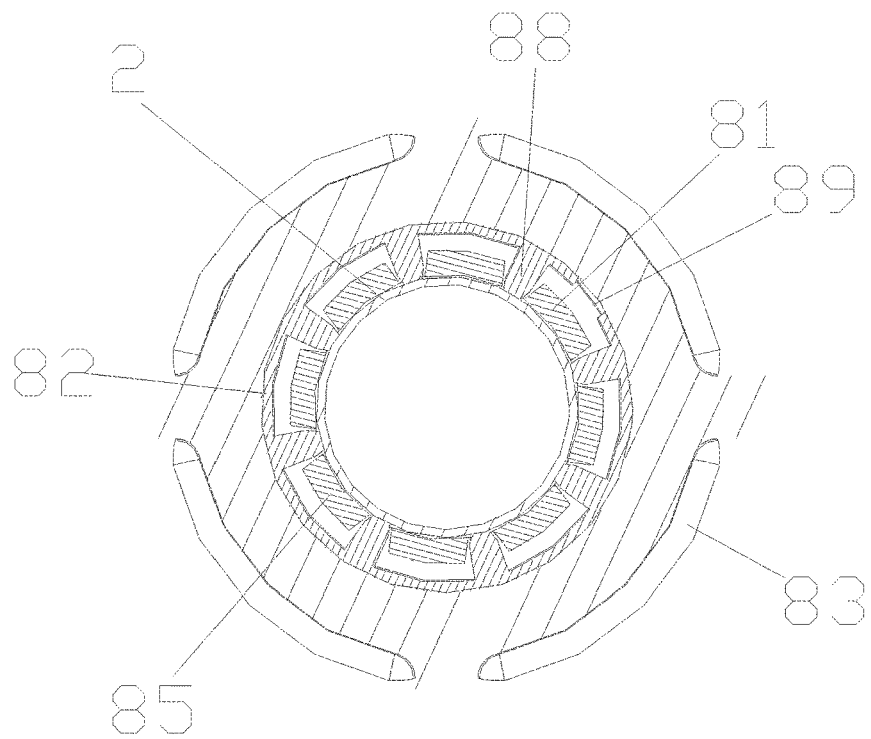
FIG. 7*a* and FIG. 7*b* are diagrams illustrating that a lifting support rod of the Embodiment 2 of the bowl with a freely adjustable height according to the disclosure is in an opening position and a locking position.
Figure 7B:
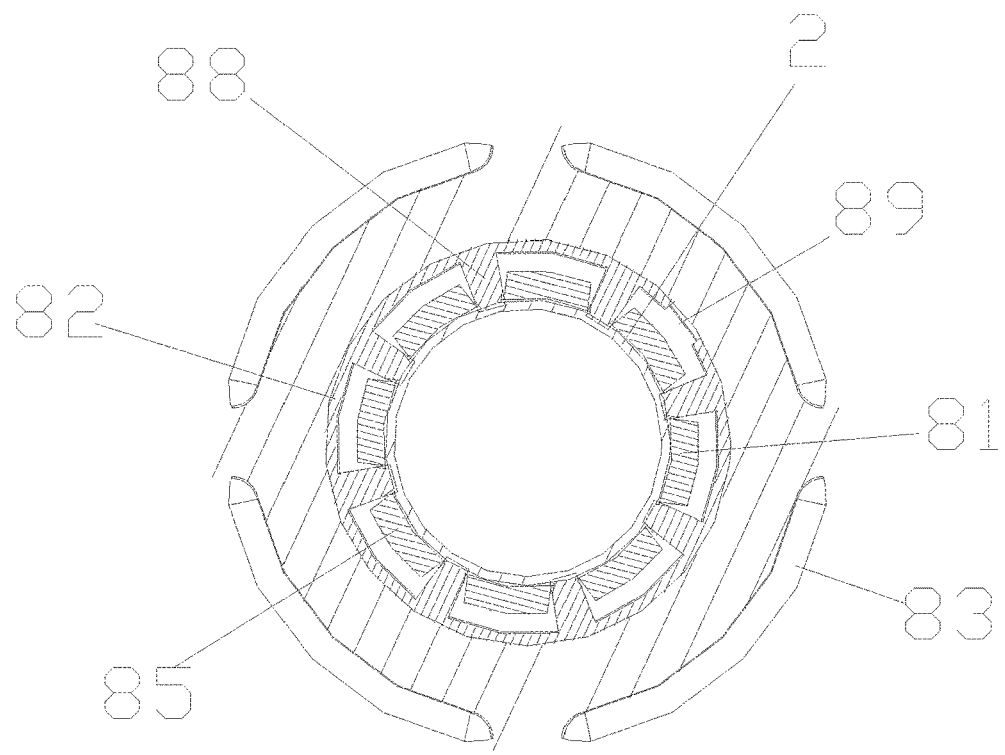

The fitting structure between the lifting support rod 2 and the lifting locking piece 4 is partially similar in Embodiment 1 and Embodiment 2, thus FIG. 3*a* and FIG. 3*b* are repeatedly described here and are no longer listed.

Embodiment 3, Please Refer to FIG. 8, FIG. 9*a*, FIG. 9*b*, FIG. 10, FIG. 11*a* and FIG. 11*b*

A bowl with a freely adjustable height provided by the embodiment of the disclosure comprises: a pedestal 1; a lifting support rod 2, whose one end is fixed on the pedestal 1; a bowl seat 3, which is fixed on the other end of the lifting support rod 2; a lifting locking piece 4, which has a fixing piece 41 and an extrusion piece 42 matched with each other, wherein the fixing piece 41 has a fixing hole 411, the lifting support rod 2 penetrates through the fixing hole 411 and is partially located in the fixing hole 411, the extrusion piece 42 exerts an action force to the fixing piece 41 so as to fix the lifting support rod 2 on the bowl seat 3, the bowl seat 3 has a through hole 31, the fixing piece 41 is fixed in the through hole 31, the fixing hole 411 is intercommunicated with the through hole 31, and the lifting support rod 2 penetrates through the fixing hole 411 and the through hole 31 and is partially located in the fixing hole 411, and the two sides of the through hole 31 of the bowl seat 3 are respectively provided with a perforation 32; and two bowl bodies 5, which are fixedly arranged in the two perforations 32 respectively, wherein the bowl body 5 is made of hard plastic, such as plastic, melamine or ceramic.

The fixing piece 41 has a locating portion 417 matched with and fixed in the through hole 31 of the bowl seat 3, the locating portion 417 is provided with a main body portion 412 downwards, the fixing hole 411 is arranged penetrating through the locating portion 417 and the main body portion 412, a plurality of securing portions 418 is extended downwards from the main body portion 412, every two adjacent securing portions 418 have a deforming groove 4181 therebetween, the extrusion piece 42 extrudes the securing portion 418, and the securing portion 418 secures the lifting support rod 2. Outside the main body portion 412 is provided an external thread, the extrusion piece 42 is provided with a securing hole 423 penetrating therethrough, on the upper end inside the securing hole 423 is provided an internal thread, the hole diameter at the upper end is greater than the outer diameter of the securing portion 418, the hole diameter at the lower end inside the securing hole 423 is less than the outer diameter of the securing portion 418, when the internal thread and the external thread are matched and fixed with each other, the securing hole 423 extrudes the securing portion 418, the volume of the deforming groove 4181 shrinks, the securing portion 418 is tightly against the lifting support rod 2, and the lifting support rod 2 and the fixing piece 41 are in the locking position, the operation is simple.

The pedestal 1 has a circular hole 11, in which a clamping piece 8 is fixedly arranged, a bottom cap 95 is located below the pedestal 1 and is matched with and fixed with the clamping piece 8, the clamping piece 8 has a base portion 90 arranged in the circular hole 11, a reinforcing bar 91 is extended upwards from the base portion 90, the reinforcing bar 91 is abutted against the pedestal 1 downwards, a thread portion 92 is extended downwards from the base portion 90, the thread portion 92 penetrates out the circular hole 11 downwards, on the lower end of the thread portion 92 is provided a plurality of mating portions 93, between every two adjacent mating portions 93 is provided a relief groove 94, inside the bottom cap 95 is provided an internal thread, the internal thread is matched and fixed with the thread portion 92, a clamping hole 84 penetrates through the reinforcing bar 91, the base portion 90, the thread portion 92 and the mating portion 93 up and down, the lifting support rod 2 is fixed in the clamping hole 84, the bottom cap 95 enables the plurality of mating portions 93 to deform and move towards the center of the clamping hole 84, making the volume of the relief groove 94 shrunk, thereby making the lifting support rod 2 against and fixed in the clamping hole 84 by means of the mating portions 93, in this way, the lifting support rod 2 is fixed on the pedestal 1 too.

Figure 8:
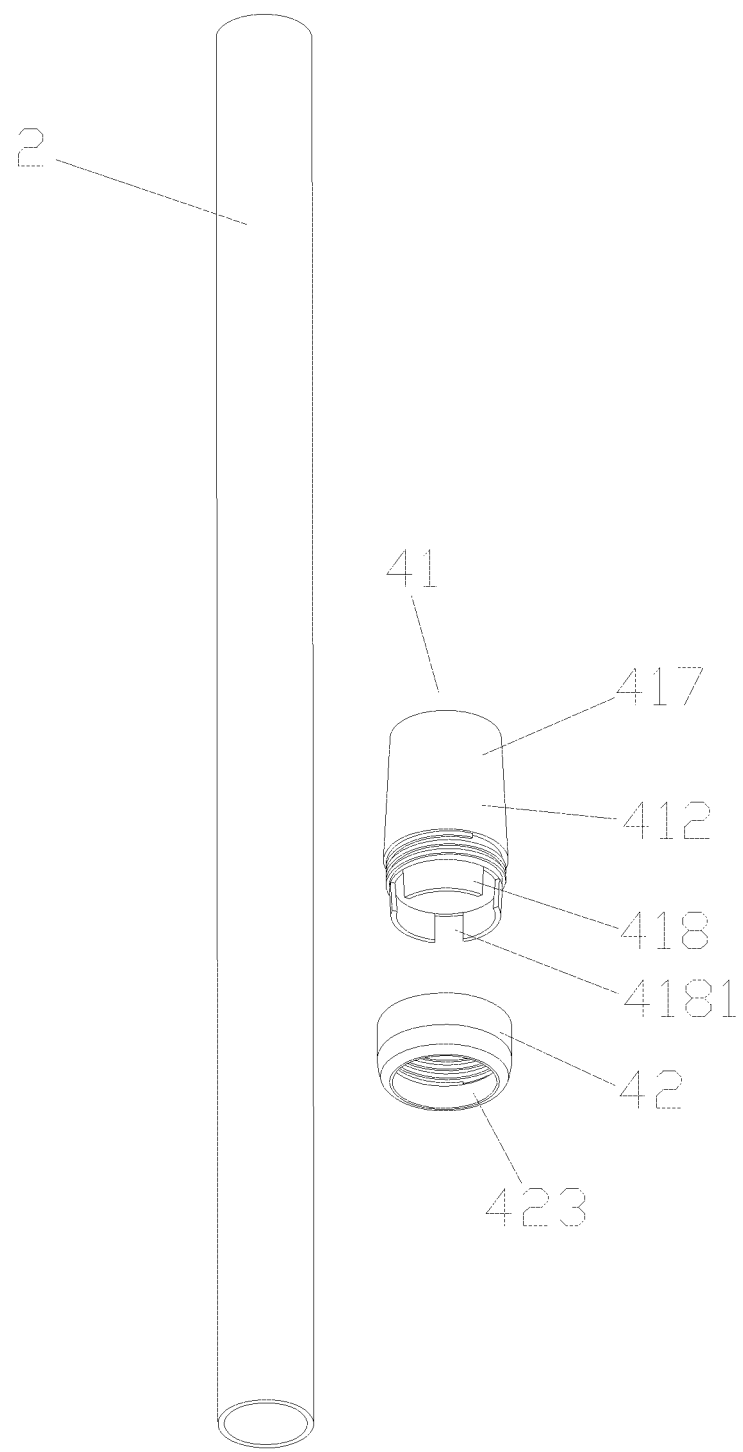
FIG. 8 is a diagram illustrating one part of an Embodiment 3 of a bowl with a freely adjustable height according to the disclosure.
Figure 9A:
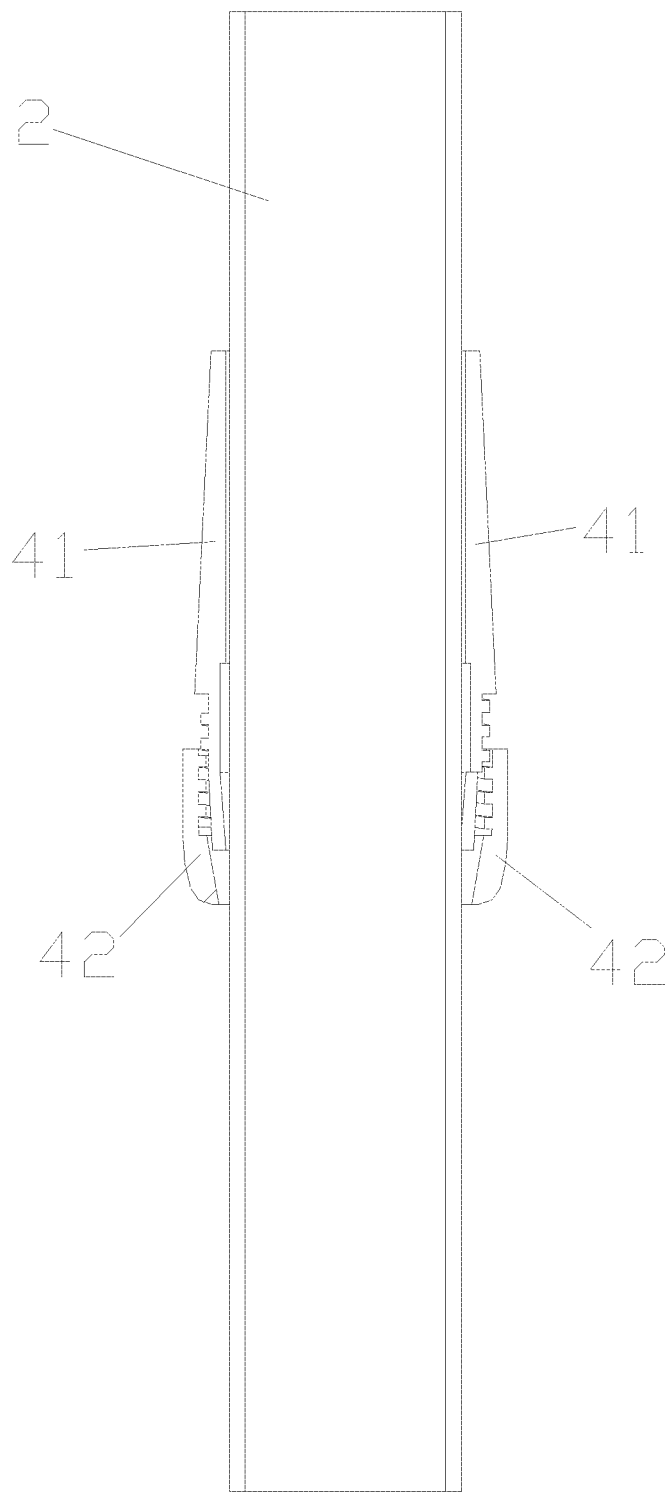
FIG. 9*a* and FIG. 9*b* are diagrams illustrating that a lifting support rod of the Embodiment 3 of the bowl with a freely adjustable height according to the disclosure is in an opening position and a locking position.
Figure 9B:
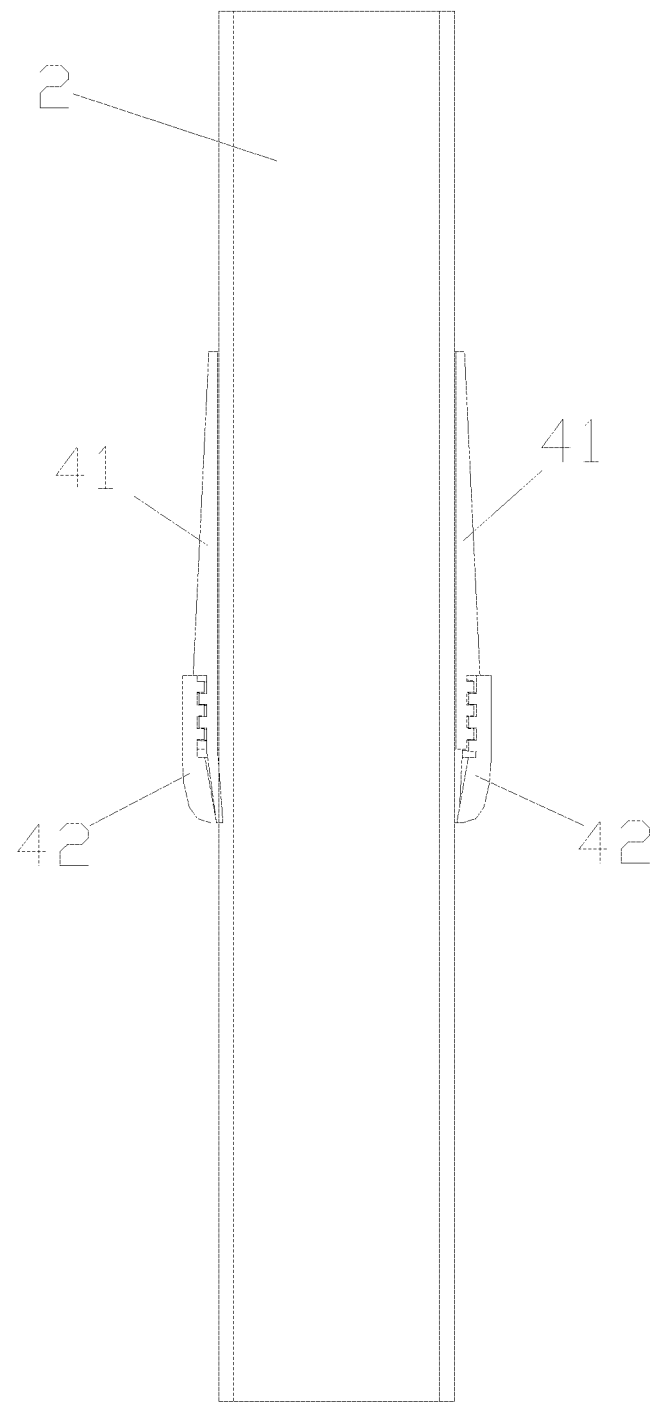

The structures of the bowl seat 3 and the bowl body 5 in Embodiment 3 are the same as the structures of the bowl seat 3 and the bowl body 5 in Embodiment 2, and FIG. 8 does not show the structures of the bowl seat 3 and the bowl body 5.

Figure 12:
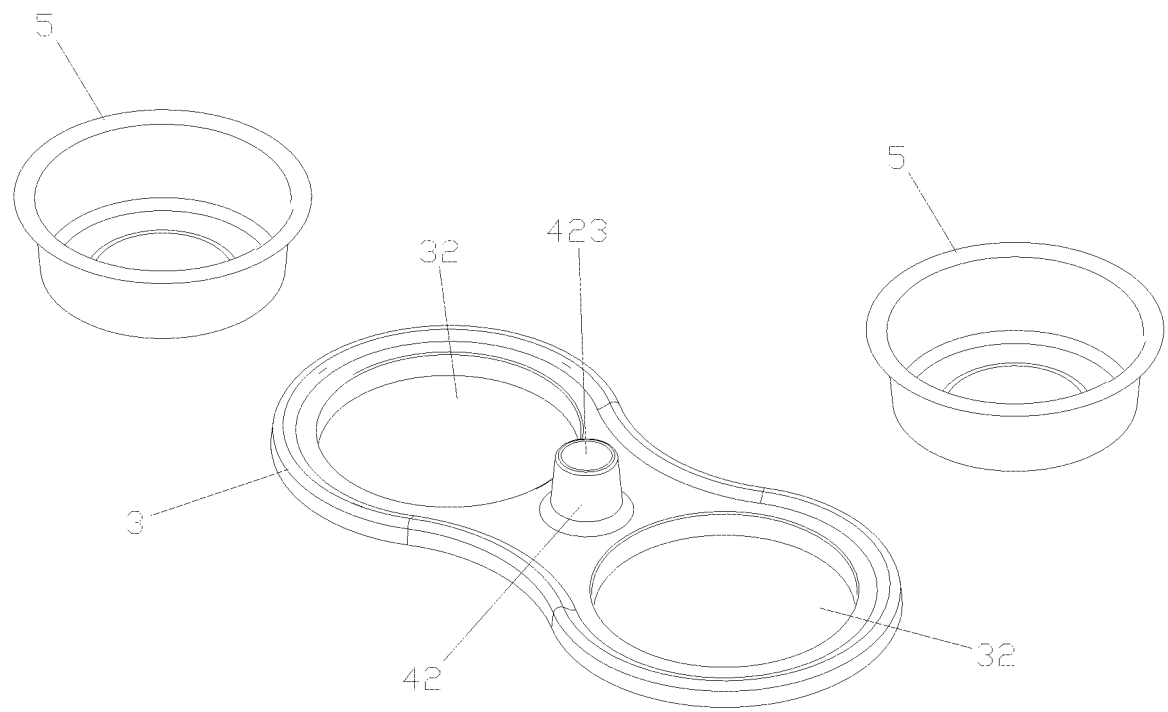
FIG. 12 is a diagram illustrating an Embodiment 4 of a bowl with a freely adjustable height according to the disclosure.
Figure 12:
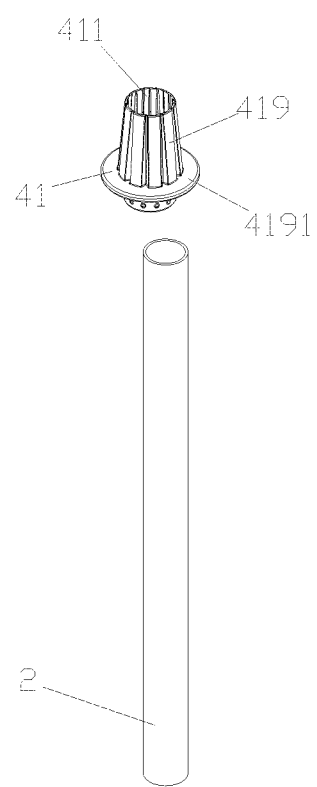
Figure 13:
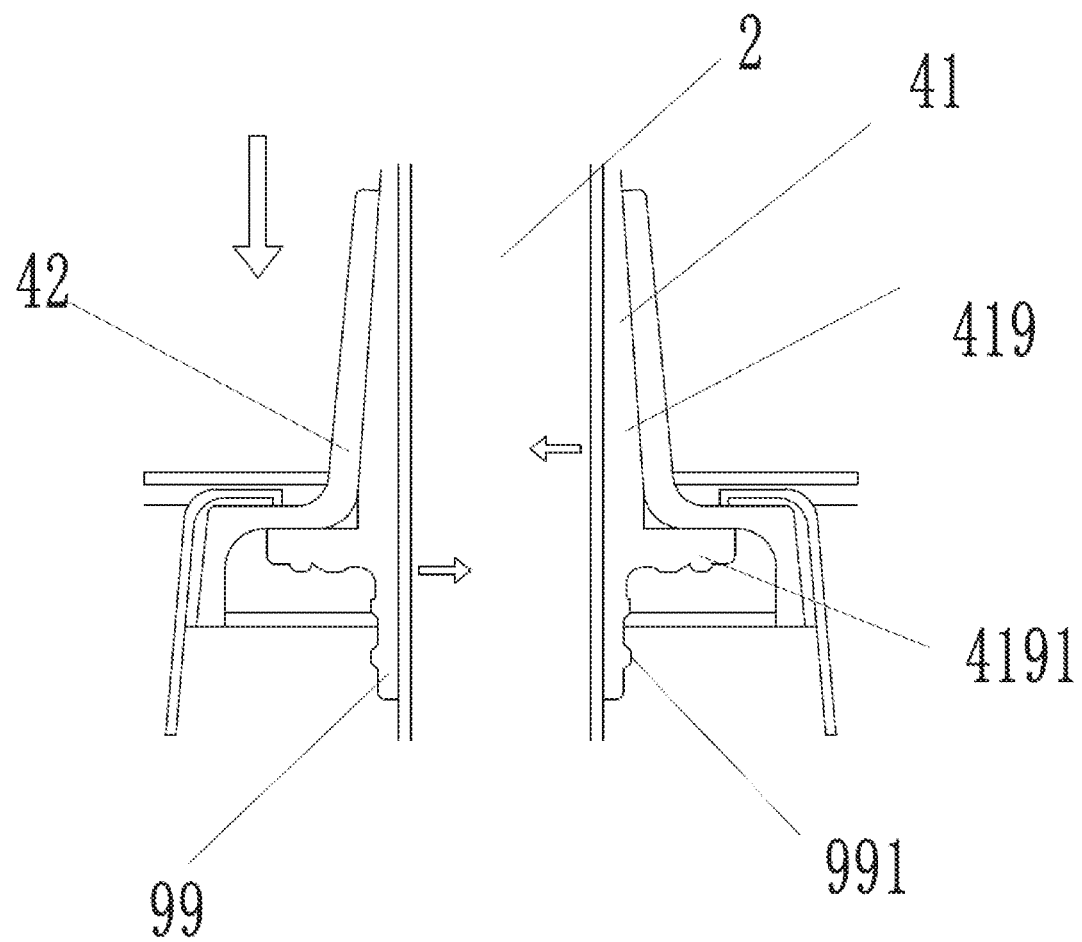
FIG. 13 is a partial sectional view of the Embodiment 4 of the bowl with a freely adjustable height according to the disclosure.

Embodiment 4, Please Refer to FIG. 12 and FIG. 13

A bowl with a freely adjustable height provided by the embodiment of the disclosure comprises: a pedestal 1; a lifting support rod 2, whose one end is fixed on the pedestal 1; a bowl seat 3, which is fixed on the other end of the lifting support rod 2; a lifting locking piece 4, which has a fixing piece 41 and an extrusion piece 42 matched with each other, wherein the fixing piece 41 has a fixing hole 411, the lifting support rod 2 penetrates through the fixing hole 411 and is partially located in the fixing hole 411, the extrusion piece 42 exerts an action force to the fixing piece 41 so as to fix the lifting support rod 2 on the bowl seat 3, the fixing piece 41 is formed by integrally extending from one side of the bowl seat 3, the extrusion piece 42 is provided with a securing hole 423 penetrating therethrough, the fixing piece 41 is fixed in the securing hole 423, and the two sides of the through hole 31 of the bowl seat 3 are respectively provided with a perforation 32; and two bowl bodies 5, which are fixedly arranged in the two perforations 32 respectively, wherein the bowl body 5 is made of hard plastic, such as plastic, melamine or ceramic.

The fixing piece 41 is provided with a plurality of deforming portions 419 arranged surrounding the fixing hole 411, the deforming portions 419 are located in the securing hole 423, below the deforming portion 419 is provided a stop portion 4191, when the stop portion 4191 abuts against the extrusion portion 42 upwards, the deforming portion 419 is tightly against the lifting support rod 2, the lifting supporting rod 2 and the fixing piece 41 are in the locking position, wherein the deforming portion 419 shrinks gradually towards the direction far away the stop portion 4191, the operation is simple, the fixing piece 41 has a lengthening portion 99, which is formed by extending downwards from the stop portion 4191 and which is against the lifting support rod 2, and the two outer sides of the lengthening portion 99 are provided with a protruding point 991 respectively, the cooperation is more stable. The fixing piece 41 is a soft sleeve, which generally is made of soft materials such as silicone rubber and TPR.

The pedestal 1 has a circular hole 11, in which a clamping piece 8 is fixedly arranged, a bottom cap 95 is located below the pedestal 1 and is matched with and fixed with the clamping piece 8, the clamping piece 8 has a base portion 90 arranged in the circular hole 11, a reinforcing bar 91 is extended upwards from the base portion 90, the reinforcing bar 91 is abutted against the pedestal 1 downwards, a thread portion 92 is extended downwards from the base portion 90, the thread portion 92 penetrates out the circular hole 11 downwards, on the lower end of the thread portion 92 is provided a plurality of mating portions 93, between every two adjacent mating portions 93 is provided a relief groove 94, inside the bottom cap 95 is provided an internal thread, the internal thread is matched and fixed with the thread portion 92, a clamping hole 84 penetrates through the reinforcing bar 91, the base portion 90, the thread portion 92 and the mating portion 93 up and down, the lifting support rod 2 is fixed in the clamping hole 84, the bottom cap 95 enables the plurality of mating portions 93 to deform and move towards the center of the clamping hole 84, making the volume of the relief groove 94 shrunk, thereby making the lifting support rod 2 against and fixed in the clamping hole 84 by means of the mating portions 93, in this way, the lifting support rod 2 is fixed on the pedestal 1 too.

Figure 10:
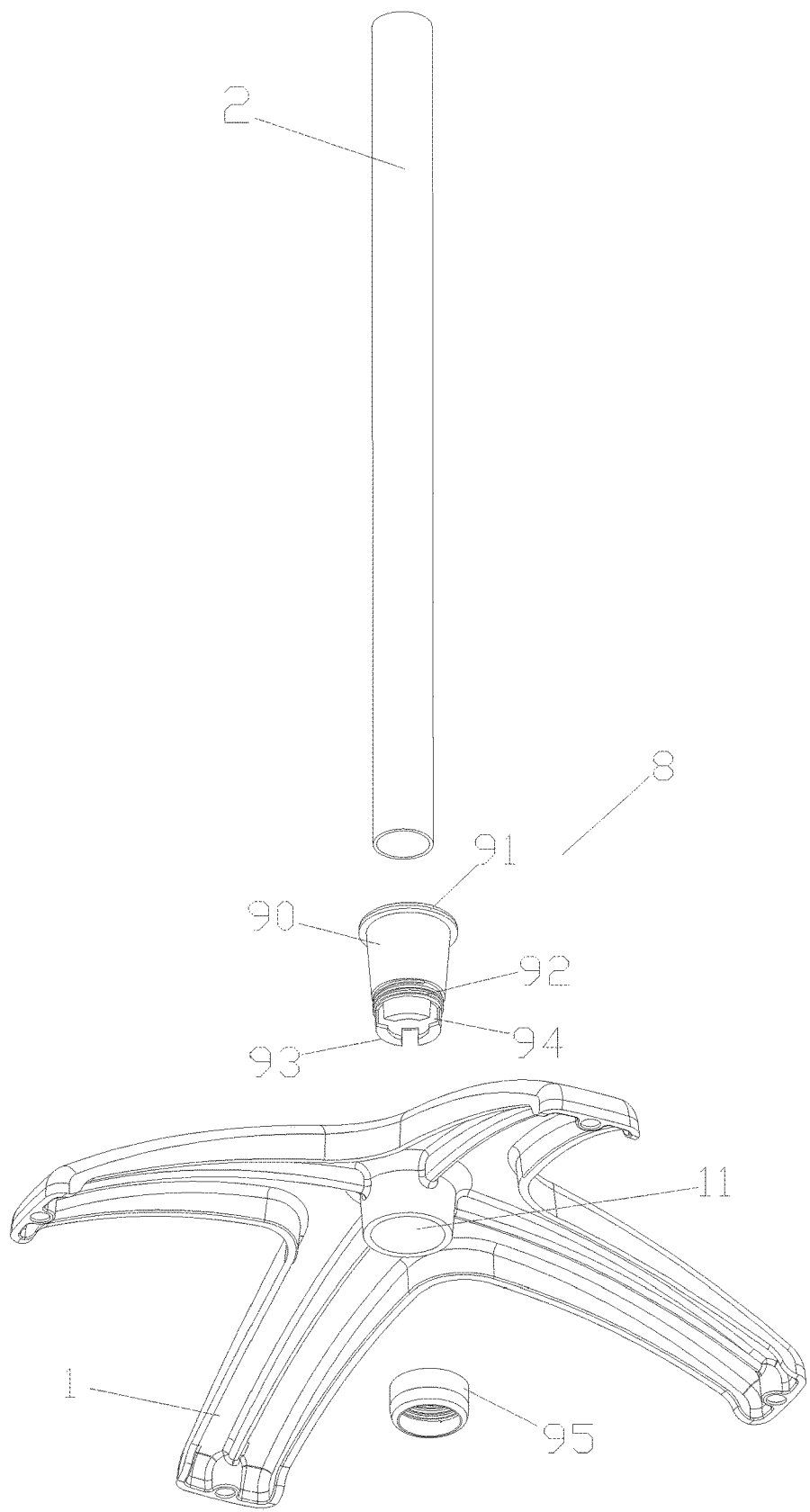
FIG. 10 is a diagram illustrating the other part of the Embodiment 3 of the bowl with a freely adjustable height according to the disclosure.
Figure 11A:
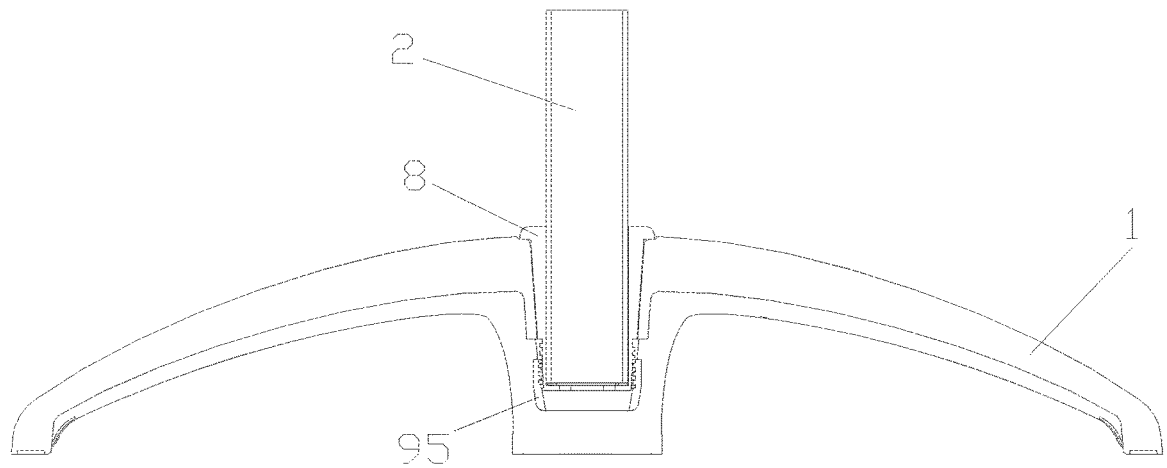
FIG. 11*a* and FIG. 11*b* are diagrams illustrating that a lifting support rod of the Embodiment 3 of the bowl with a freely adjustable height according to the disclosure is in an opening position and a locking position.
Figure 11B:
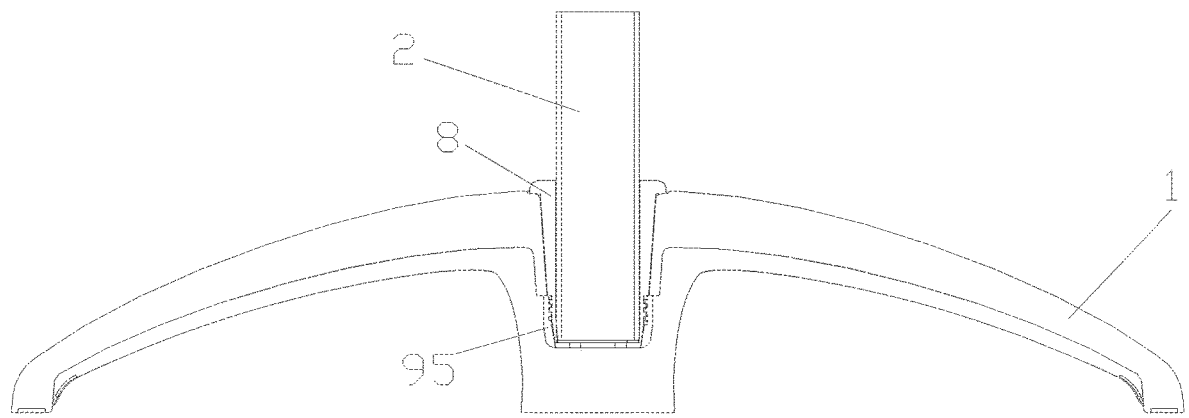

The fitting and fixing way between the pedestal 1 and the lifting support rod 2 is the same in Embodiment 3 and Embodiment 4, thus FIG. 10, FIG. 11a and FIG. 11b are repeatedly described here and are no longer listed.

The fitting and fixing way between the pedestal 1 and the lifting supporting rod 2 may be exchanged in the Embodiment 1 to Embodiment 4, all the fitting and fixing ways are available, so that the lifting locking piece 4 is fixed on the pedestal 1; the Embodiment 1 to Embodiment 4 belongs to one general invention idea, many structures therein are the same or similar, thus the designators are the same and partial designators are not repeatedly indicated.

In the above bowl with a freely adjustable height, the fixing piece 41 and the extrusion piece 42 of the lifting locking piece 4 are matched with each other, the lifting support rod 2 penetrates through the fixing hole 411 and is partially located in the fixing hole 411, the extrusion piece 42 exerts an action force to the fixing piece 41 so as to fix the lifting support rod 2 on the bowl seat 3, the fixing piece 41 may be matched with and fixed on the bowl seat 3 or arranged on the bowl seat 3, thus, the height of the bowl may be adjusted freely, the design adopts a simple mechanical structure to enable the production of friction so as to fix the bowl at certain height, stepless regulation of height may be realized, the installation is convenient, the height of the bowl may be regulated depending on different growth stages of pets, waste is avoided, and, when the bowl is not used, components may be disassembled, so as to reduce transport and storage volumes.

The above detailed description is merely the description of the preferred embodiments of the disclosure, and is not intended to limit the patent scope of the disclosure; therefore, all equivalent technology changes made according to the description of the disclosure and the content shown in the drawings are intended to be included in the patent scope of the disclosure.

What is claimed is:

1. A bowl with a freely adjustable height, characterized in that the bowl comprises:
   a pedestal;
   a lifting support rod, whose one end is fixed on the pedestal;
   a bowl seat, which is fixed on the other end of the lifting support rod;
   a lifting locking piece, which has a fixing piece and an extrusion piece matched with each other, wherein the fixing piece has a fixing hole, the lifting support rod penetrates through the fixing hole and is partially located in the fixing hole, the extrusion piece exerts an action force to the fixing piece so as to fix the lifting support rod on the bowl seat, and the fixing piece is matched with and fixed on the bowl seat or arranged on the bowl seat; and
   at least one bowl body, which is arranged on the bowl seat;
   one side of the bowl seat is provided an extending portion which is provided with a through hole, the fixing piece has a locating portion fixed in the through hole and a main body portion extending downwards from the locating portion, and the fixing hole is arranged penetrating through the locating portion and the main body portion.

2. The bowl with the freely adjustable height according to claim 1, characterized in that: the two sides of the bowl seat are provided with a perforation respectively, and the bowl comprises two bowl bodies fixedly arranged in the two perforations respectively.

3. The bowl with the freely adjustable height according to claim 1, characterized in that: the pedestal is provided with a circular hole, the lifting support rod is fixed on the pedestal by means of a clamping piece, the clamping piece has a base, a friction piece and an upper cover that are mutually matched, a clamping hole penetrates through the upper cover, the friction piece and the base up and down, and the lifting support rod is fixedly arranged in the clamping hole.

4. The bowl with the freely adjustable height according to claim 3, characterized in that: the upper end of the base has an external screw tooth, the lower end of the base has a plurality of isolating portions, between every two adjacent isolating portions is provided a strip-shaped hole, the strip-shaped hole is intercommunicated with the clamping hole, an abutting portion is connected below the base, the inner side of the friction piece is provided with a plurality of convex ribs at intervals, the convex ribs enter the strip-shaped holes correspondingly and are exposed to the clamping hole, on one side of the friction piece is provided a notch penetrating therethrough up and down, the friction piece is sleeved on the periphery of the isolating portions and abuts against the abutting portion downwards, and the upper cover is sleeved on the periphery of the friction piece.

5. The bowl with the freely adjustable height according to claim 4, characterized in that: the upper end of the upper cover is provided with an internal screw tooth, which is matched and fixed with the external screw tooth, and all the upper cover, the friction piece and the base shrink gradually upwards.

6. The bowl with the freely adjustable height according to claim 4, characterized in that: the outer side of the upper cover is provided with a plurality of reinforcing ribs, which are arranged surrounding the outer circumference of the upper cover, below the plurality of reinforcing ribs is provided a resisting portion, and the resisting portion and the abutting portion are matched to locate.

7. The bowl with the freely adjustable height according to claim 4, characterized in that: the convex rib shrinks towards the centre of the clamping hole, and the two sides of the free end of the convex rib are provided with a guiding portion respectively.

* * * * *